United States Patent [19]

Soto et al.

[11] Patent Number: 4,989,202
[45] Date of Patent: Jan. 29, 1991

[54] ISDN TESTING DEVICE AND METHOD

[75] Inventors: Roy L. Soto, Moorpark; Wiley J. Ehrke; Robert J. Homkes, both of Camarillo, all of Calif.

[73] Assignee: Harris Corporation, Melbourne, Fla.

[21] Appl. No.: 257,686

[22] Filed: Oct. 14, 1988

[51] Int. Cl.⁵ .............................................. G06F 11/20
[52] U.S. Cl. ................................... 370/13; 370/110.1; 371/15.1
[58] Field of Search ...................... 370/110.1, 100, 13, 370/14, 15, 17, 58; 371/5, 22; 361/18; 379/1, 5, 6, 30, 2, 21, 23, 31, 32

[56] References Cited

U.S. PATENT DOCUMENTS

| | | | |
|---|---|---|---|
| 4,688,214 | 8/1987 | DeWitt et al. | 370/110.1 |
| 4,730,313 | 3/1988 | Stephenson et al. | 371/5 |
| 4,736,364 | 4/1988 | Basso et al. | 370/110.1 |
| 4,766,594 | 8/1988 | Ogawa et al. | 379/5 |
| 4,792,800 | 12/1988 | Fujioka et al. | 370/110.1 |
| 4,803,702 | 2/1989 | Chen et al. | 370/100 |
| 4,812,839 | 3/1989 | Okada et al. | 370/100 |

Primary Examiner—Benedict V. Safourek
Assistant Examiner—Alpus H. Hsu
Attorney, Agent, or Firm—Antonelli, Terry, Stout & Kraus

[57] ABSTRACT

A test device and a method of testing are provided for an integrated services digital network (ISDN) system having a Network Terminator (NT), a system/terminal (S/T) interface for coupling the NT to a Terminal Equipment (TE), a transmit line between the S/T interface and the NT to permit a TE coupled to the S/T interface to transmit D channel and B channel information to the NT, and a receive line coupled between the NT and S/T interface to permit a TE coupled to the S/T interface to receive D channel and B channel information from the NT. The test device performs an initial line connection test to determine if a satisfactory line connection exists between the NT and the S/T interface connected by the transmit and receive lines by providing a predetermined signal to the NT from the test device and for evaluating a response from the NT to the predetermined signal. A satisfactory line connection between the S/T interface and the NT is indicated if the response from the NT is a predetermined response, while an unsatisfactory line connection is indicated if the response is not said predetermined response. A plurality of additional tests are performed after the initial line connection test to determine the location of a problem in said line connection if the initial line connection test indicates that the line connection between the S/T interface and the NT is unsatisfactory.

43 Claims, 12 Drawing Sheets

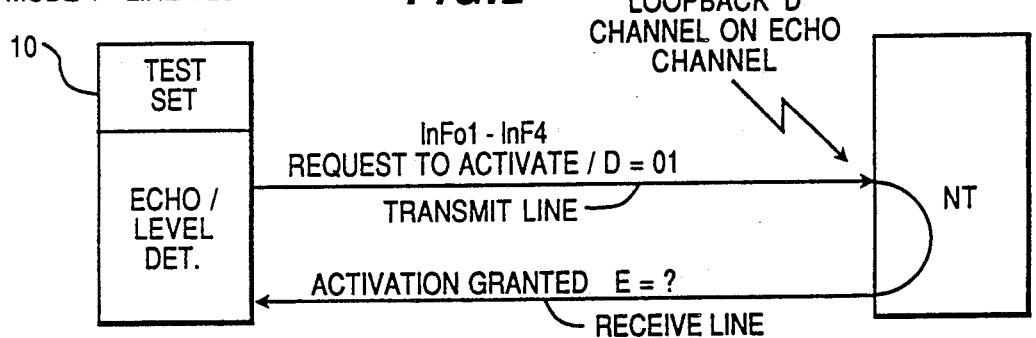
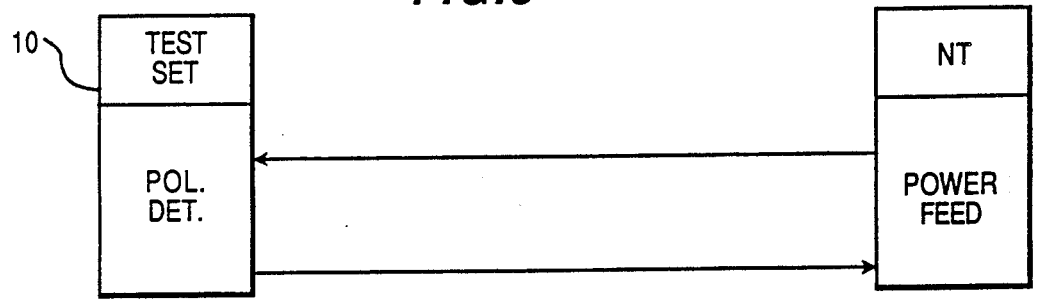
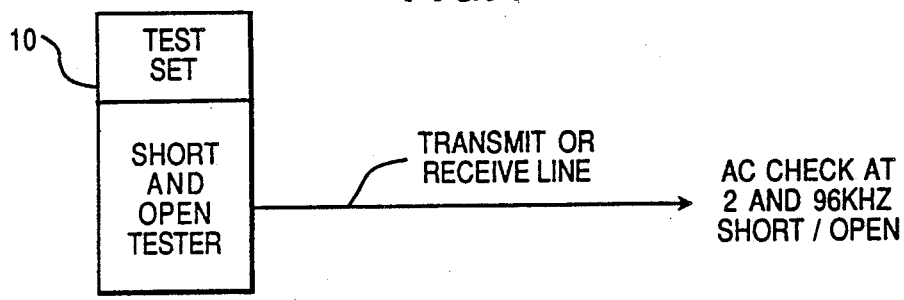

MODE 4 - RECEIVE

1. GREEN LIGHT ON - GOOD RECEIVE LINE
2. RED LIGHT ON - ERROR ON RECEIVE LINE OR IN NT CLOCKS

MODE 5 - MONITOR

1. RED LIGHT ON - D CHANNEL ACTIVITY

1. GREEN LIGHT ON - GOOD TRANSMIT LINE
2. RED LIGHT ON - ERROR ON TRANSMIT LINE

1. GREEN LIGHT ON - LEVEL ABOVE 338MVP
3. RED LIGHT ON - LEVEL BELOW 338MVP (-6db)

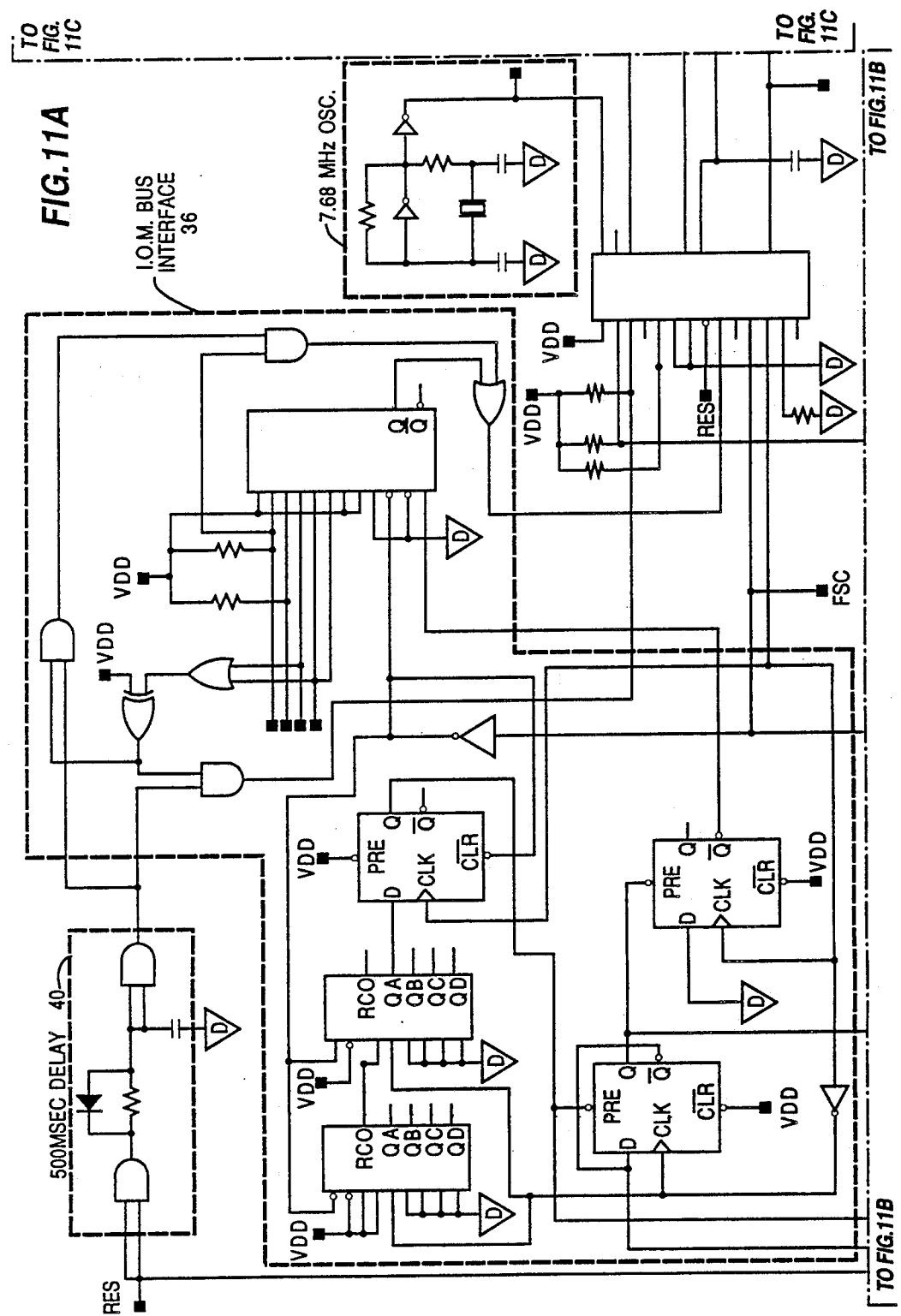

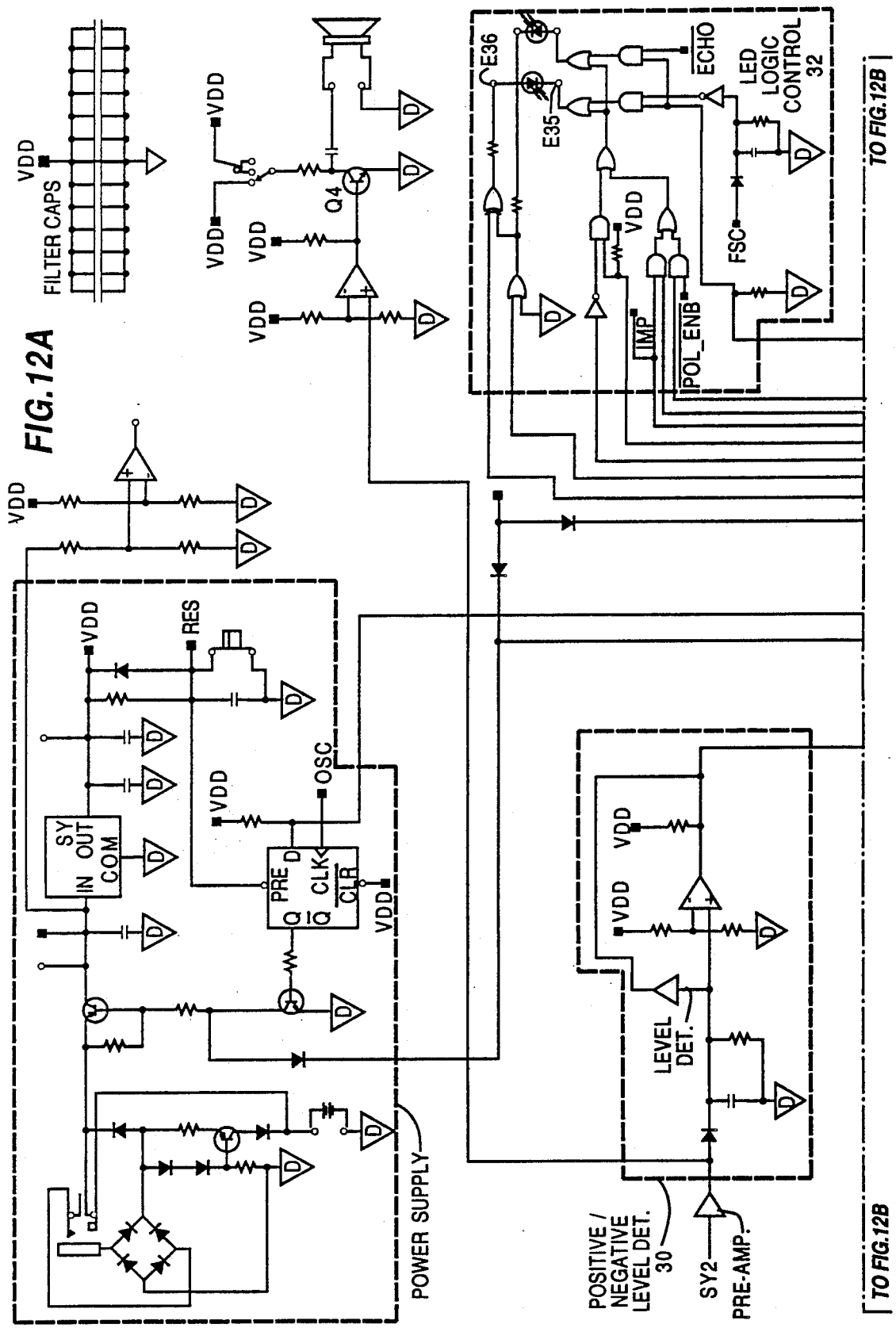

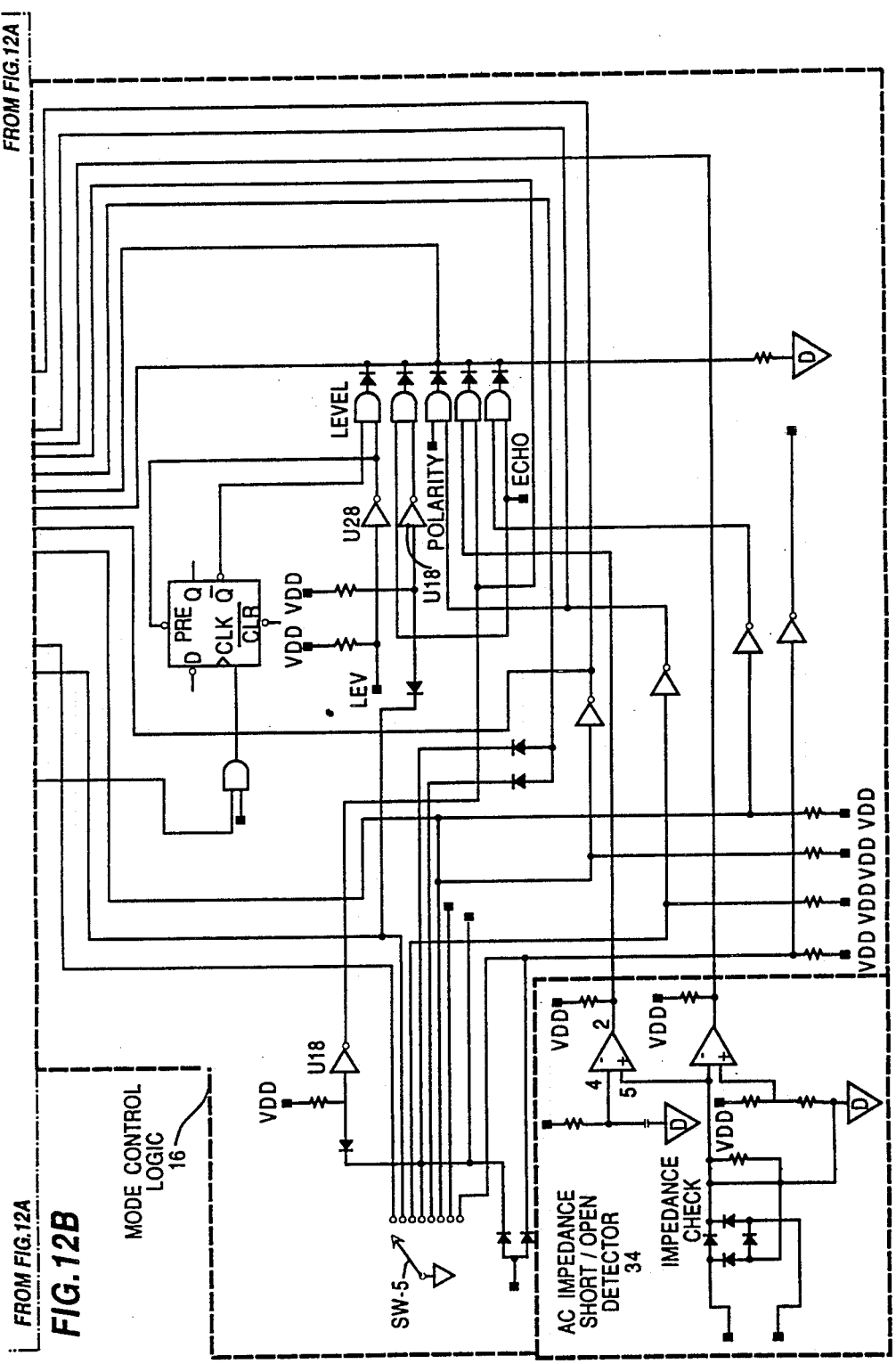

ISDN TESTING DEVICE AND METHOD

BACKGROUND OF THE INVENTION

The present invention is directed generally to a testing apparatus and method for an ISDN (Integrated Services Digital Network) system, and, more particularly, to a testing apparatus and method that can be used at a terminal equipment (TE) location to determine whether a satisfactory connection is available at the TE location from a network terminator (NT), and to identify the source of the problem if a satisfactory connection is not provided.

Recently, extensive work has been done in developing ISDN systems which are expected to greatly improve services available to subscribers. ISDN is presently being promoted by telephone companies in an effort to improve quality, capacity, and variety of services. Preliminary ISDN specifications have been introduced by CCITT, the international communications standards committee. In the U. S. and Canada, subsets and minor variations of these standards are being defined by the major central office equipment vendors, such as AT&T and Northern Telecom.

The technical concept of ISDN is being accomplished by using the existing copper telephone lines to carry a digital signal instead of the usual analog voice (limited to 3000 Hz). The digital signal is transmitted at a rate of 144,000 bits per second (bps), offering two 64,000 bps channels (known as "B" channels) for voice or data calls, and one 16,000 bps channel (identified as the "D" channel) for establishing and maintaining the call connection to the network (and also used for sending data packets using the X.25 protocol) as a basic service. Implementation of ISDN requires new central office switching and transmission equipment, and sometimes dramatically different terminal equipment (e.g., telephones, modems, data terminals) at the user or subscriber end of the telephone line. At present, ISDN is starting limited technical field trials in several cities around the U. S., and is already being widely implemented in Europe.

Technicians and installers of ISDN circuits often need to identify the source of trouble in the event of problems in making or answering a voice or data call. As noted above, in basic ISDN service, the voice or data information is carried by one of two B channels on the ISDN circuit. The call transactions to make a connection, or link, are established via the D channel. Messages sent to and from the central office on the D channel contain the information defining the status of the link. It is very important to know what part of the link activity is failing to determine if the trouble is in the local equipment or elsewhere. All D channel information may be displayed in the following formats:

1. Binary.
2. Hex.
3. Bus activation state.
4. OSI layer 1 HDLC frames.
5. OSI layer 2 LAPD/LAPD decoder frames.
6. OSI layer 3 Q.931 and decoder X.25 frames.

FIG. 1 shows a basic ISDN terminal which the present invention can be used in conjunction with. The terminal is divided into functional groupings. By separating functions conceptually in this way, it is possible to identify and specify the interfaces between them. A description of the functional groups is as follows, noting that this description is confined to the functions of basic access.

NT1—Network Termination 1. This is the group of functions which terminate the transmission line. As such, it is seen in the CCITT recommendations as belonging to the network provided, i.e., the owner of the transmission line. The functions of the NT1 are described as:
Line transmission termination.
Line maintenance and performance monitoring.
Timing.
Power transfer, extracting power from the line to drive at least the "wake-up" portion of the terminal.
Parts of the multiplexing functions.
Termination of the T interface which may include multi-drop termination and associated contention resolution functions.

NT2—Network Termination 2. This is the group of functions which give the terminal its particular "character". An NT2 could be a PABX if access is primary, a LAN or a terminal controller. The functions of the NT2 are described as:
Protocol handling or handling that part of the protocol associated with information transfer across a network.
The higher-level parts of the multiplexing function.
Switching and concentration functions.
Maintenance functions.
Interface functions to the S and T interfaces.
The NT2 functional group may be more or less complex depending on the application. The range extends from the quite complex function of a PABX down to relatively simple functions required for a time division multiplexer. In specific, simple cases all the functions may be adequately performed by NT1, and NT2 becomes merely physical connections.

TE—Terminal Equipment. This is the device itself. It could be a digital telephone, a CADCAM workstation, a computer terminal, etc.

TE1—Terminal Equipment Type 1. Such terminal equipment complies with ISDN user-network interface recommendations and therefore supports interface S.

TE2—Terminal Equipment Type 2. Such a terminal supports the same functions but does not comply with the ISDN user-network interface recommendations. It must therefore interface with the ISDN access via a TA Terminal Adapter which converts the non-ISDN interface functions into ISDN acceptable form at reference points S or T.

This description has largely revealed the nature of the interfaces. A further description is as follows:
Reference point T (T for Terminal) Separates the network provider's equipment from the user equipment. Provides a standardized interface between equipment, sending and receiving, validating and timing information to the network and to terminal equipment devoted to the use of this information.
Reference point S (S for System) Separates the user terminal equipment from the network functions of the terminal.
Reference point R (R for Rate) Provides a non-ISDN interface between non-ISDN compatible user equipment and adapter equipment. Such an interface may well comply with one of the CCITT X series interface recommendations.

Reference point U (U for User) Interface between NT1 and the transmission line.

The terminology from FIG. 1 will be used throughout the rest of the specification. This terminology is presently well accepted standard terminology, as discussed, for example, in the textbook, "The Integrated Services Digital Network: from Concept to Application", by John Ronayne, published by John Wiley & Sons, Inc., 1988, which is hereby incorporated by reference. Applicants also hereby incorporate by reference related application Ser. No. 192,174 and application Ser. No. 192,175 by S. Coffelt et al, filed on May 10, 1988. It is to be noted that throughout the specification, the term "TE" (terminal equipment) will be used to generically identify both the use of ISDN compatible equipment TE1 and ISDN non-compatible equipment TE2 together with a commercially available terminal adapter (TA).

It is also to be noted that throughout the specification the term "NT" (network termination) will be used to generically identify both the NT1 and NT2 shown in FIG. 1, and that the term "S/T interface" will be used generically to cover both the S interface and the T interface referred to in FIG. 1. This is done since it is possible for the present invention to be used both at the S interface and the T interface of FIG. 1 depending upon the particular system being used. This, of course, is a reflection of the particular NT1 and NT2 equipment which is being used.

In the past, testing systems for ISDN systems have been quite complex. Specifically, prior test equipment has provided very detailed information regarding all of the protocols of the ISDN system. Although this is, of course, quite useful, it requires a great deal of training for technicians and installers to be able to properly interpret this detailed information.

As a result, it has been difficult in the past for many technicians and installers who do not have the benefit of extensive training to run tests at a TE location to determine if a satisfactory connection is provided at the S/T interface from the NT, and, if not, what the source of the problem is. Accordingly, there is a need for a "user friendly" testing device and method to allow technicians and installers to readily inspect and trouble-shoot ISDN systems at TE locations.

OBJECTS OF THE INVENTION

It is an object of the present invention to provide an improved ISDN testing device and method.

It is a further object of the present invention to provide an improved device and method that permits a user to determine whether a satisfactory connection is available at an S/T interface from a NT, and to identify the source of the problem if a satisfactory connection is not provided.

SUMMARY OF THE INVENTION

To accomplish these and other objects, the present invention provides a test device and method which is coupled to the S or the T interface. A first predetermined D channel signal is transmitted to the NT through the transmit line to request a response from the NT. The response from the NT is then received by the test device on the receive line. It is then determined whether a satisfactory line connection exists between the S or the T interface and the NT based upon whether the response signal is a predetermined signal. If the response signal is non-existent or is not the predetermined signal, it is determined that an unsatisfactory line connection exists. In this case, further tests are run on the transmit line and the receive line to determine the source of the problem.

Accordingly, the present invention provides a basic ISDN test set and method which can be a hand-held communication line tester to allow a technician to inspect and trouble-shoot an installation of an ISDN CPE (customer premise equipment) within a building. In particular, the integrity of the twisted pair and the proper operation of the associated NT interface can be verified. The device and method provides user friendly controls that permits technicians and installers to identify the source of the trouble without having to interpret the complexity of ISDN protocols. It also provides both monitoring and transmitting functions on the D channel along with various modes of operation that allow technicians to trouble-shoot point-to-point or passive bus configurations. The status of every test run is indicated by a green or red LED, or other appropriate indicator.

BRIEF DESCRIPTION OF THE DRAWINGS

FIGS. 2 to 9 are block diagrams showing different modes of testing which the present invention is capable of performing;

FIGS. 11 and 12 are schematic diagrams showing a particular construction of elements which can be used to form the overall block diagram of FIG. 10.

DETAILED DESCRIPTION

Figure 1:
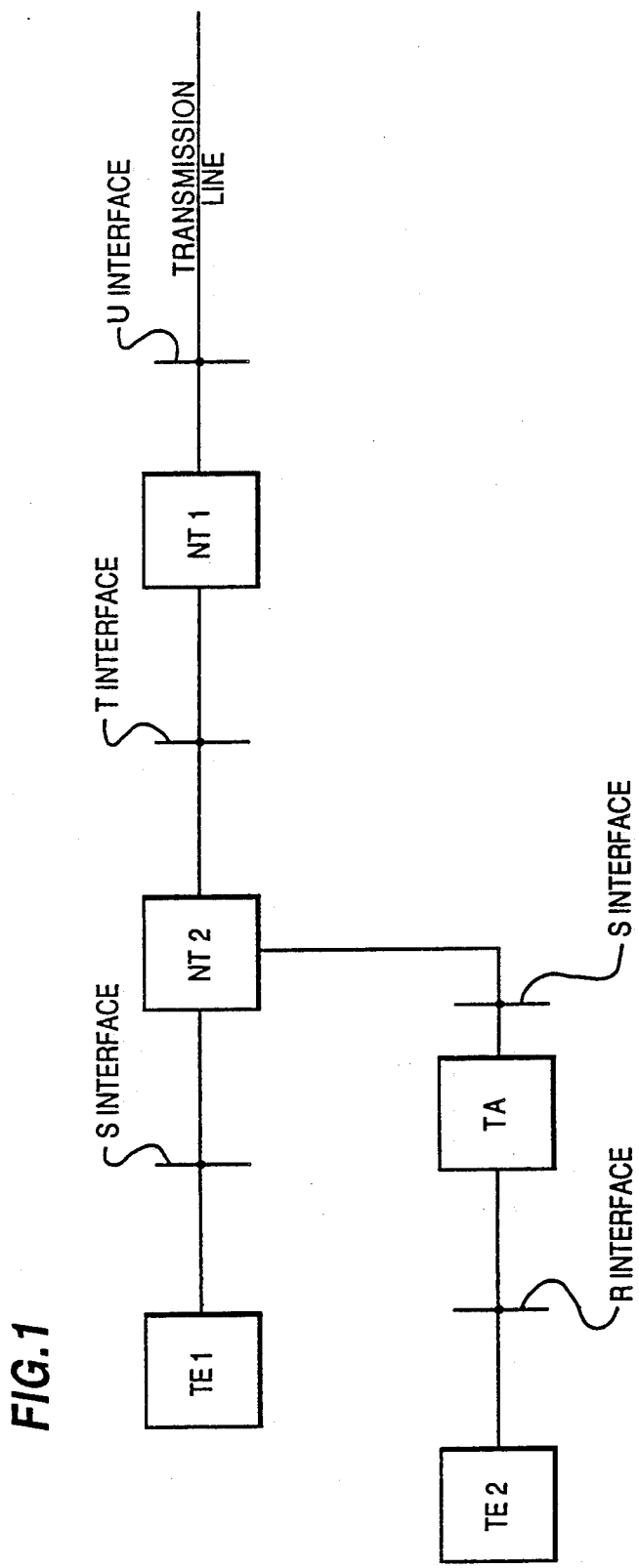
FIG. 1 shows a block diagram of a basic ISDN system for purposes of illustrating an environment in which the present invention can be used.

The present invention provides a test device and method to perform a sequence of tests in order to quickly and easily determine whether a satisfactory line connection exists and, if not, what the source of the problem is.

To this end, a first important line test (Mode 1) is run, as shown in FIG. 2. This test will verify immediately whether the NT is responding correctly to layer 1 and layer 2 parameters. It is to be noted that the test device includes a mode selector switch to select which mode is to be used (e.g. see FIG. 10).

As shown in FIG. 2, this test is carried out by the test device 10 first sending a "request to activate" signal to the NT over the transmit line (typically a twisted pair line) connecting the S/T interface with the NT. In accordance with known ISDN formatting, this request to activate signal is an Info 1–Info 4 signal conventionally sent from TEs to activate an NT to begin communication between the NT and the TE. After activation, the test device 10 sends a predetermined D channel signal to the NT. In FIG. 2, this predetermined D channel signal is shown as being a repetitive pattern of 01, although the invention is not, of course, limited to this.

The test device 10 includes an echo comparator detector to receive an echo signal E from the NT on the receive line (typically a twisted pair line), in response to the D channel signal which the test device sent to the NT over the transmit line. If D=E (for example, if E also has the repetitive pattern 01), then it is determined that the line connection to the NT is satisfactory. In this case, a green LED at the test device (or other suitable indicator) is activated to indicate to the user that the line is satisfactory. On the other hand, if the echo signal E is non-existent, or is not equal to D, then a red LED (or other suitable indicator) is activated at the test device 10.

One significant advantage of the present invention is that the testing ca usually stop at this point if the results of the Mode 1 line test show that the line connection to the NT is good. In such a case, the user knows that the particular TE location has a satisfactory line connection between the S/T interface and the NT. Therefore, the user can immediately proceed to testing other TE locations.

On the other hand, if the results of the Mode 1 line test show that the line connection is bad, then further testing must be made. FIGS. 3 to 9 show additional Modes 2–8 that can be used for this. The particular sequence of these tests has been chosen because it provides a convenient sequence which the inventors have found to generally isolate the source of the problem quickly. This convenience will become apparent from the discussion which follows. However, it should be borne in mind that the invention is not only limited to this particular sequence of testing since variations could be made, if desired. Also, it is not necessary to conduct all of these modes if it is determined that it is not necessary to investigate all of the potential sources of difficulty. However, as noted above, this particular sequence does provide a very convenient approach for quickly discovering the most common faults leading to an indication in Mode 1 that the line connection is not satisfactory.

Another important aspect of the present invention is that it permits the user to separately test the transmit and receive lines to isolate the problem to one or the other of these. In fact, the present invention actually provides several ways to do this, with a first general test being made followed by a more specific test to isolate the source of the problem if it occurs in either the transmit or receive lines.

Turning to the testing sequence shown in FIGS. 3 to 9, FIG. 3 illustrates a test for polarity (Mode 2) that can be run to indicate the polarity of a phantom feed which can be supplied from the NT to the test device. Such a power feed is a feature of some NTs (i.e., phantom feed) in providing power to TEs for operation. In such a case, the Mode 2 polarity test will indicate whether the power feed is provided, and, if so, whether it has normal polarity or not. If no power feed is provided, the test set 10 will not light either the red or green LED. If power feed from the NT has proper polarity, the green LED will light. On the other hand if the power feed has a reverse polarity, the red LED will light. This indication of reverse polarity will immediately inform the user that the transmit and receive lines connected between the test device and the NT are reversed. This is a very common error made in installation of ISDN equipment, and the Mode 2 polarity test provides a quick way to isolate this fault in cases where the NT provides a power feed.

It should be noted that an alternate way to check for reversed polarity in the transmit and receive lines in cases where the NT does not provide a power feed is to provide a normal/reverse switch in the test device 10 for internally reversing the signals provided to the test device from the transmit and receive lines (this will be discussed in more detail with regard to the illustration provided in FIG. 10). Specifically, to test polarity in such a situation, the user can run the Mode 1 line test first with the normal/reverse switch in the normal position and then in the reverse position. If the results of the Mode 1 line test are red for the normal connection but green for the reverse switch position, then the user will immediately know that the transmit and receive lines are reversed. This could also, of course, be done even in situations where the NT does provide a power feed. However, the advantage of running the polarity check in Mode 2 if the NT does provide a power feed is that it will establish that the power feed from the NT is actually in proper operation.

FIG. 4 shows the Mode 3 AC impedance test used for quickly checking for shorts and opens and proper termination on the transmit and receive lines. As noted above, the test device 10 includes the normal/reverse switch. When the normal/reverse switch is set to the normal position in Mode 3, the transmit line connected between the test device and the NT is checked by providing an AC signal from the test set 10. When the normal/reverse switch is set to the reverse position, the receive line between the test device and the NT is checked, assuming that the NT is in an idle state, by sending an AC signal from the test device to the NT through the receive line.

Although the invention is not limited to this, a 96 kHz signal is appropriate for use in this test. During the test, a green LED will indicate an open line (e.g. greater than 500 ohms), while a red LED will indicate a shorted line (e.g. less than 40 ohms). A good line is indicated if no lights are turned on (e.g. indicating a line between 40 ohms and 500 ohms). By virtue of this testing, a quick check can be made on the transmit and receive lines, individually, to determine if either of them is faulty in the sense of containing either shorts or opens or in being improperly terminated. It should be noted that the resistance values given above are solely for purposes of example.

Although the Mode 3 AC impedance test provides a quick and easy check of the transmit and receive lines, it is a rather simple test which does not actually seek to establish communication with the NT. Accordingly, situations can occur when the Mode 3 test will indicate no shorts or opens (and proper line termination), but where the transmit or receive lines are actually not capable of carrying out proper communication between the test device and the NT. For example, it might be possible that a given transmit or receive line between the S/T interface and the NT will have other TE equipment tapped onto it. In such a case, the Mode 3 AC impedance test might indicate satisfactory transmit and receive lines (i.e. in the sense of proper termination with no shorts or opens) between the test device 10 and a TE along the line, rather than between the test device and the NT. At this stage of testing, the user would not know this. Thus, if a fault occurred on the transmit line or the receive line between the other TE and the NT, this would not be discovered in the Mode 3 test. Accordingly, more sophisticated tests for the transmit and the receive lines are provided in accordance with the present invention, which will be described hereinafter.

Figure 5:
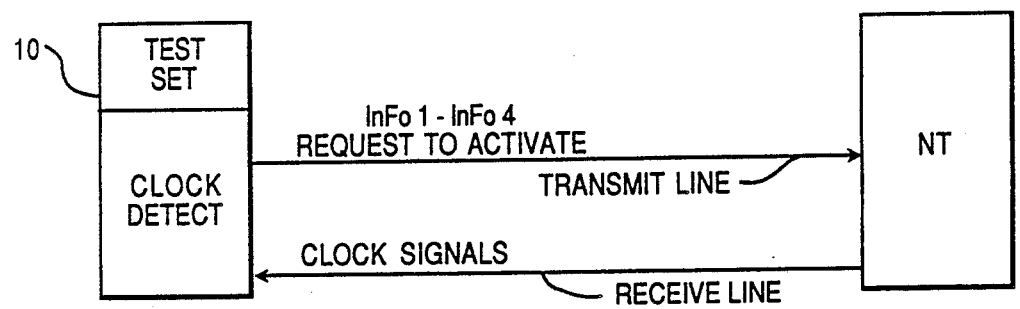

FIG. 5 shows the Mode 4 receiving test. This test is specifically designed to further verify the operating status of the receive line and to determine whether the NT is providing at least a framing clock to the TE location to permit clocks in the test device to be synchronized to the NT. This is accomplished by the test device 10 sending a request to activate (e.g. the Info 1–Info 4 signals referred to previously) to the NT to activate the NT to begin generating clock synchronizing signals. As will be discussed later with regard to FIG. 10, this request to activate will also activate clocks within the test device itself. If the NT is operating properly, its clocks should take over to synchronize the clocks of the test device (which it sees as being a TE) to the clock of the NT.

Therefore, to continue the receiving test, the test device will turn off its clocks after sufficient time has been provided for synchronizing the NT and the test device. The clocks in the test device will remain deactivated unless the clocks in the NT reactivate them. Therefore, by checking whether the clocks in the test device are reactivated, it can be determined if the test device is receiving proper clocking from the NT. In this case, a green LED is lit. If the green LED is not lit, then the test device is not receiving synchronizing clock signals from the NT.

Although the previous test of Mode 3 for shorts and opens and proper termination provided a basic indication that the receive line is sound, this receiving test of Mode 4 will serve as further verification of this. Further it will specifically provide an indication that satisfactory clock signals are being provided from the NT.

It should be noted that although this test is initiated by a request to activate signal from the test device to the NT over the transmit line of the test device, a situation can occur where the NT is activated from some other source. In such a case, even if the transmit line is actually faulty, this test of Mode 4 would indicate a good receive line if the NT clocks are synchronized to the test device's clocks over the receive line. Therefore, a subsequent test is necessary to further study the transmit line.

Figure 6:
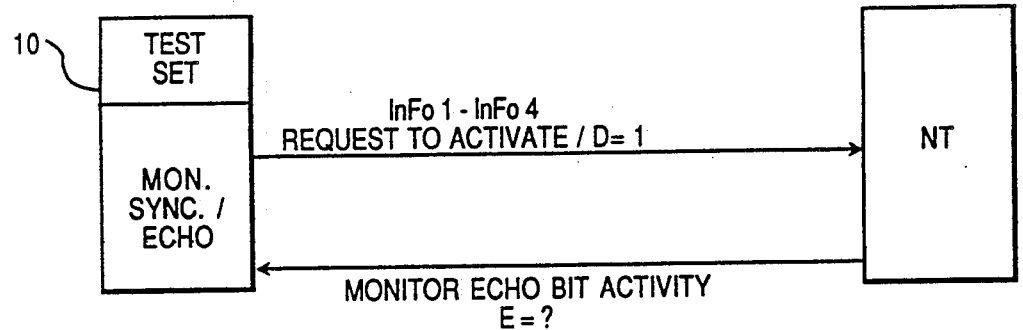

FIG. 6 shows the Mode 5 monitoring test. In this mode, the test device 10 sends the request to activate signal (e.g. Info 1–Info 4) to the NT and then sends a repetitive pattern of D=1 to establish an idle state. In this state, any activity on the D channel will then be monitored by the test device by monitoring echo channel activity, and such activity will be indicated by the flashing of the red LED. This allows the test device to monitor activity between the NT and other TEs which might happen to be connected to the NT. This can be useful to determine if such other equipment connected to the NT is actually functioning properly, as will be discussed further hereinafter.

It should be noted that the Mode 4 receiving operation and the Mode 5 monitoring operation can be combined into a single mode. In such a case, the green LED in the test device will indicate whether the clock synchronization with the NT has properly occurred. If no green light appears, this will mean that there is no proper clock synchronization with the NT. As was the case in Mode 5, the blinking of the red light will indicate activity by other equipment on the line.

Figure 7:
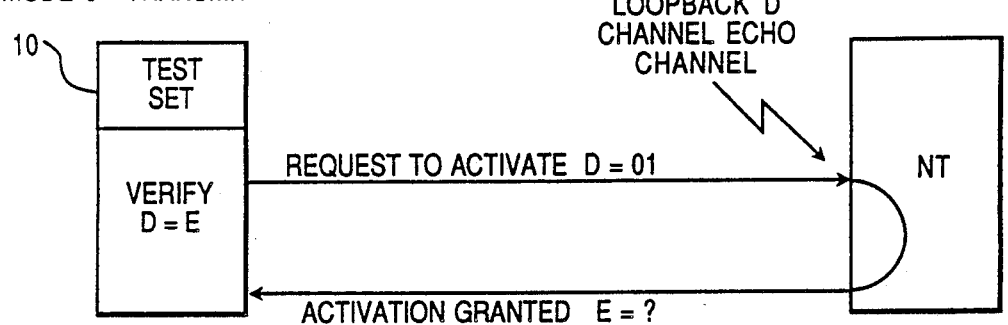

FIG. 7 shows the Mode 6 transmit test. The purpose of this is to provide a more detailed study than that provided by the Mode 3 impedance test regarding the connection of the transmit line from the test device to the NT. Essentially, this test is identical to the line test of Mode 1. Thus, the request to activate signal is provided from the test device to the NT over the transmit line, followed by sending a repetitive D channel of 01. Then, the echo signal on the receive line is analyzed to see if D=E, as was discussed with regard to Mode 1.

One reason for running this test of Mode 6 at this point is to verify that something is wrong with the transmit line if the receive test of Mode 4 has already indicated that the receive line is satisfactory As mentioned earlier, this could occur if something else other than the test device has activated the NT to produce synchronizing clock signals along the receive line. Accordingly, by rerunning the same line test of Mode 1 as the transmit test of Mode 6, it is verified that you do not have a closed loop between the test device and the NT. This would then isolate the fault as being somewhere in the transmit line.

Figure 8:
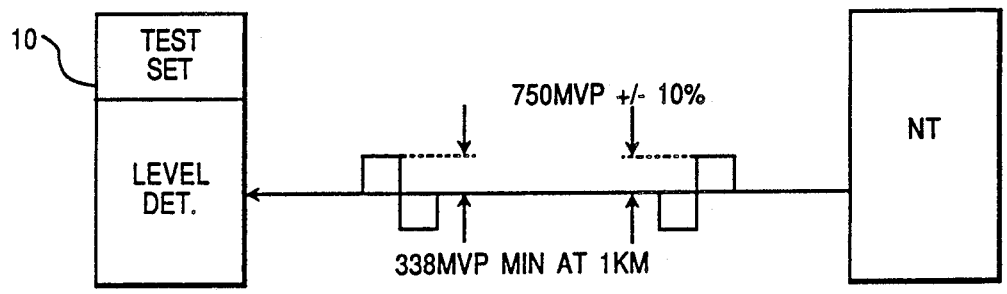

FIG. 8 shows the Mode 7 level test which is used to study the level of the response from the NT to the test device. In this test, a signal is produced by the NT (e.g. a typical data signal) which has a predetermined level (e.g. 750 MVP +/−10%), and this is provided to the test device over the receive line. The test device then studies the level of the signal from the NT to determine if it is satisfactory. Typically, if the distance of the NT from the test device is 1 KM, the signal from the NT should have a loss no greater than −6 dB. Thus, the actual received level at the test device for a transmitted 750 MVP signal should be at least 338 MVP. Accordingly, if the level of the receive signal at the test device is greater than or equal to 338 MVP, the green LED will be activated, and if it is below 338 MVP, the red LED will be activated.

Regarding the level test, it should be noted that sometimes one might want to run this test even if the results of the Mode 1 line test indicate a satisfactory line connection. This might be the case if, for example, one is studying a location where a given piece of terminal equipment has not been operating properly with the NT being studied. If, in such a case, the test device 10 indicates in Mode 1 that the line connection is proper, the technician might wish to investigate further to try to see why the test device indicates a satisfactory condition but the terminal equipment is not working. In performing such further investigation, the Mode 7 level test allows the user to study the level of the received signals from the NT. This will identify situations where a satisfactory line connection is provided for the test device, but the level of response is actually too low for the given piece of terminal equipment in question to operate properly.

Figure 9:
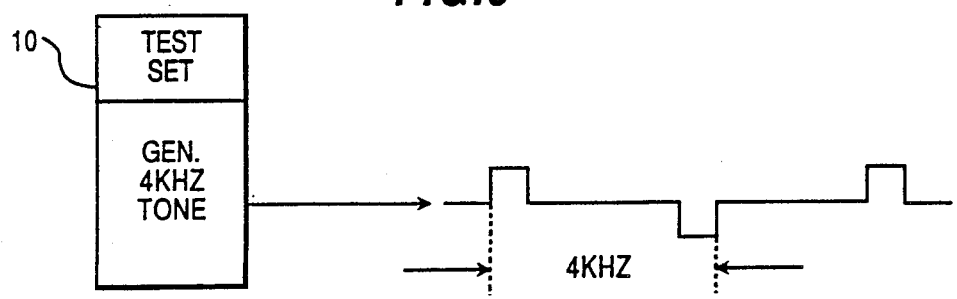

Finally, FIG. 9 shows the Mode 8 4 kHz tone test. This is simply a mode in which a 4 kHz tone signal is generated to permit tracing through the system. One convenient way to utilize this is to actually use two test devices 10 coupled to the S/T interface to the NT. One of the test devices will generate the four kHz tone in Mode 8 while the other test device receives the tone and transmits it over a speaker (e.g. see FIG. 10). The technician can then listen to the tone over the speaker to trace through the system to detect any variations in the tone. It should be noted that the speaker can also be used during the Mode 5 monitoring test for listening to activity by other TEs connected to the NT.

Figure 10A:
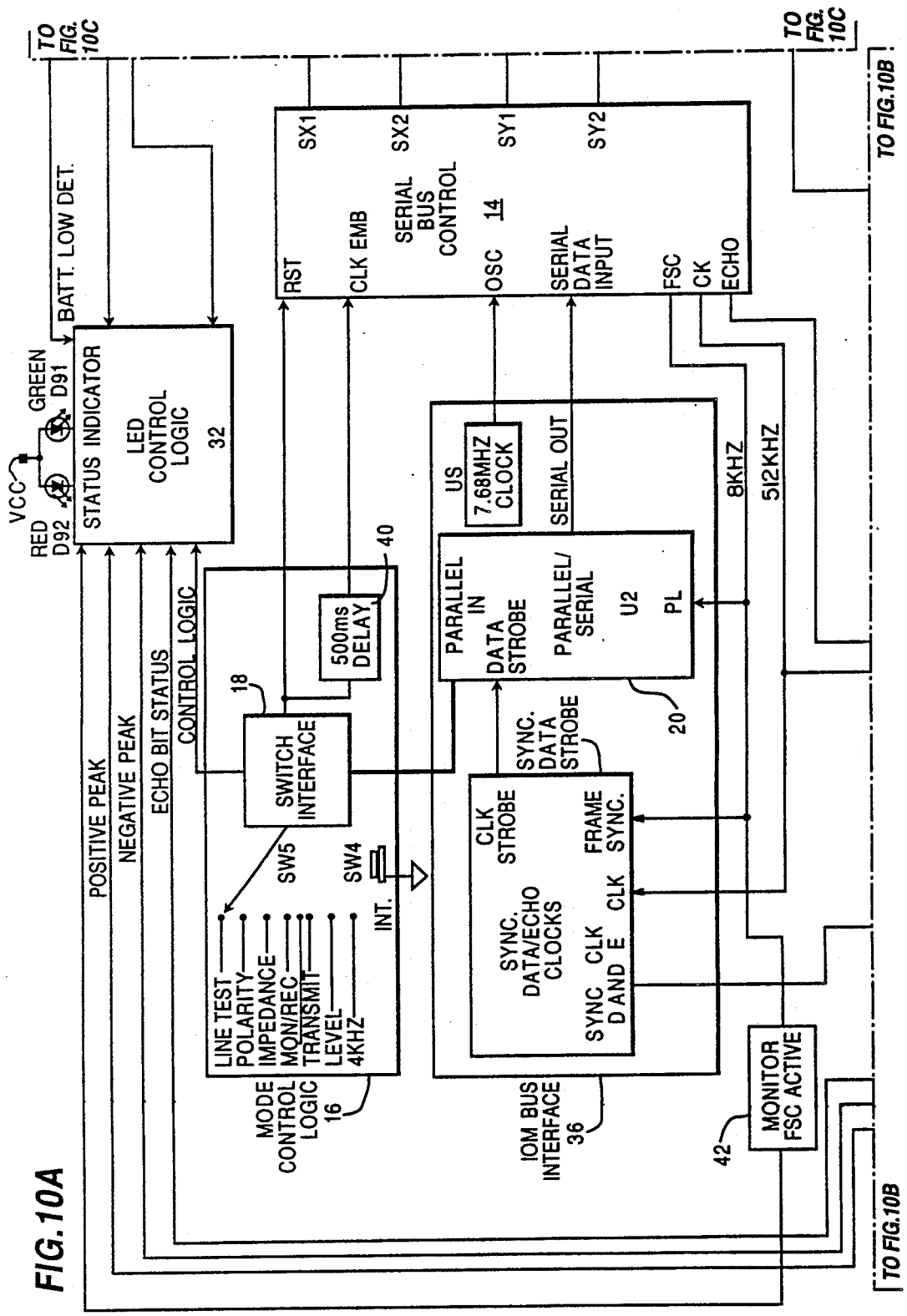
FIG. 10 is an overall block diagram of a first embodiment of the present invention.
Figure 10B:
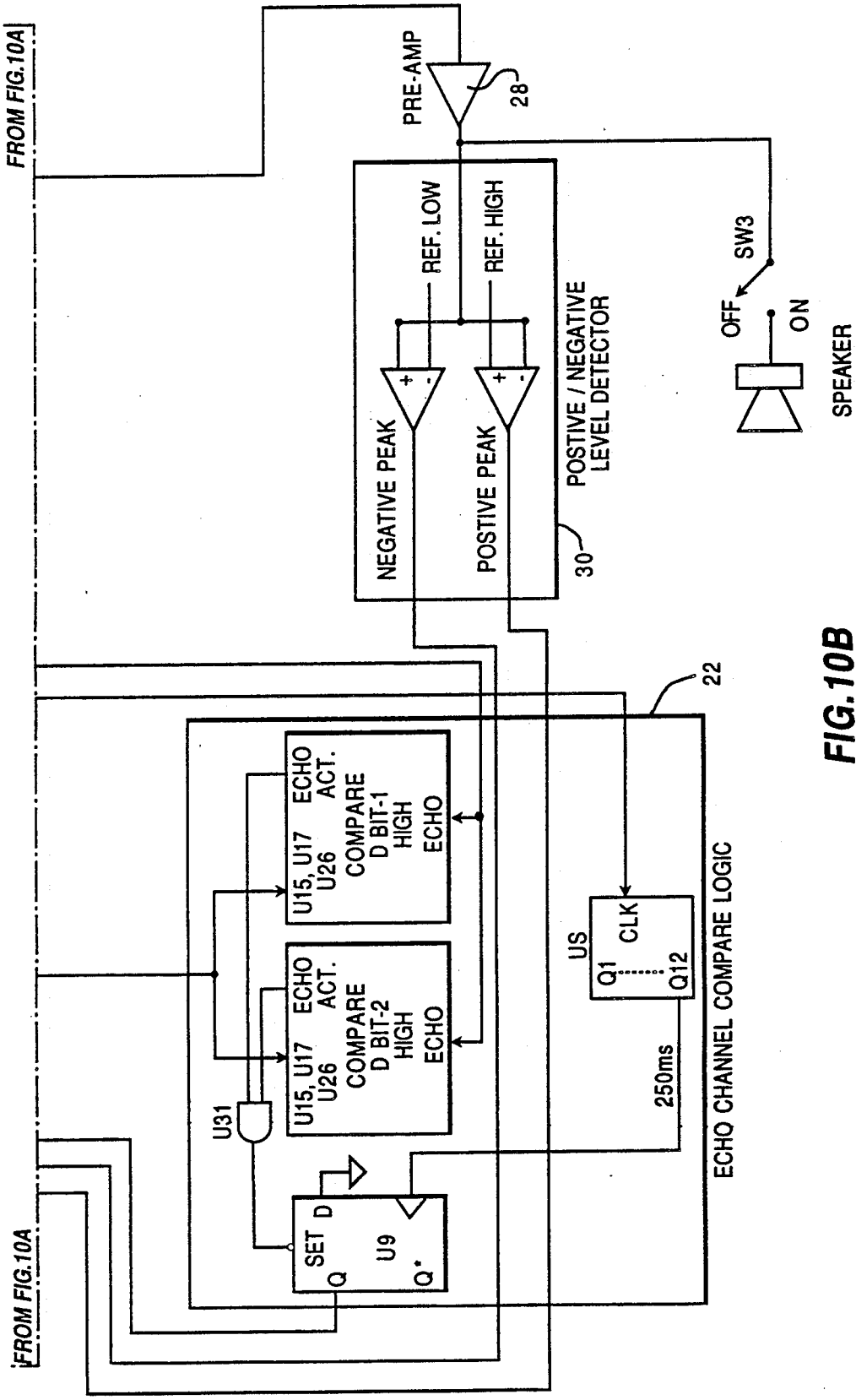
Figure 10C:
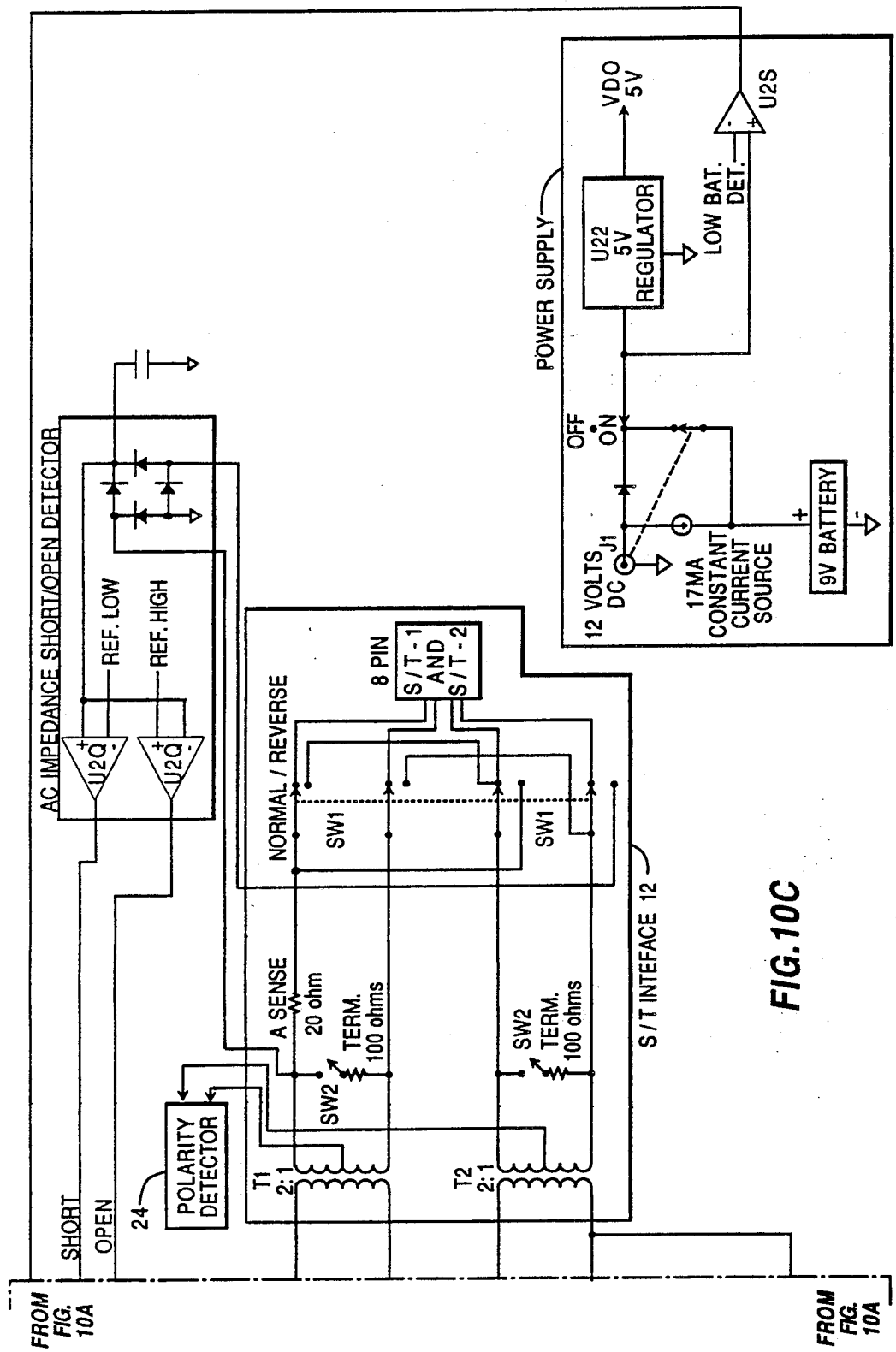

FIG. 10 is a block diagram of a preferred embodiment of a test device 10 for carrying out the modes of operation described in FIGS. 2 to 9. As shown in FIG. 10, the S/T interface identified with numeral 12 can be an 8-pin interface for providing the physical link between the test device and the NT. As mentioned previously, this S/T interface can be used at either the S interface or the T interface location of FIG. 1, depending upon the nature of the particular ISDN system being tested. The term "S/T interface" is used in the present specification as a generic term to reflect this fact.

As shown in FIG. 10, the S/T interface can be formed of two 4-wire interfaces S/T-1 and S/T-2 in parallel for passive bus configuration. Four pins in the S/T interface 12 would typically be used for connecting the test device to the NT. These four pins will be connected to the transmit line and receive line to and from the NT, each of which is typically formed of a twisted wire pair (typically providing data transfer at 192 Kbits/sec). The additional pins of the S/T interface can be used, if desired, to provide an additional power connection to the test device. As noted earlier, it is often the case that the NT itself provides a power feed to the S/T interface, and this would be through the two pins coupled to the receive line. However, in other cases, a separate power source (i.e. from a source other than the NT) can be used, and this can be provided at two or more pins of the S/T interface that are not coupled to the transmit or receive lines.

Regarding the S/T interface 12, it should be noted that it is designed so that the test device 10 will conform with procedures for terminal side equipment outlined in CCITT recommendations sections 8.1–8.9 and I.430. A switch SW-2 is provided to terminate the S/T interface line with 100 ohms. In point-to-point configurations only one TE should be terminated. In passive bus configurations only the last device located on the bus should be terminated. Another switch SW-1 (NORMAL/REVERSE) is provided for normal line feed or reversing the pair of wires over the S/T interface 12.

As will be discussed in greater detail hereinafter, the test device 10 of FIG. 10 utilizes a serial bus controller (SBC) 14 to provide layer 1 functions according to CCITT recommendations I.430 for communicating with the NT through the S/T interface 12. The SBC 14 provides coded outputs to the NT based on the mode position set by the user on the mode control logic 16. As shown in FIG. 10, the mode control logic 16 includes a switch interface 18 to generate signals up to 8 bits regarding the mode selection. These signals from the switch interface are converted by a parallel/serial register 20 to provide a series input to the SBC 14. The SBC 14 also operates to generate clock signals FSC and CK, as will be discussed later. Further, it provides echo signals which are received from the NT to the echo channel comparator logic 22. Although the present invention is not limited to this, the SBC 14 can be constructed by the Siemens serial bus controller chip 2080.

Phantom feed power (polarity) from the NT is detected by a polarity detector 24 coupled to the S/T interface 12. The output of the polarity detector 24 is fed to the LED control logic. An illuminated green LED indicates normal feed, red indicates a reversal, and no light indicates no phantom feed, as discussed earlier with regard to Mode 2.

Power is supplied to the test device 10 by an external power supply or internal 9-volt rechargeable battery 26. J1 provides the input jack for an external DC power supply and switch for selecting the internal 9-volt battery 26. With no external power supply, all of the power is consumed from the 9-volt battery. When an external power supply (12 VDC) is provided, the battery is switched off and goes into a charge mode of 17 ma. All of the power is then consumed from the external power supply coupled to J1.

Transmitted data from the NT is received at the S/T interface 12 and input to T2. T2 is a step-up pulse transformer (1:2) that feeds SBC 14 and a preamplifier 28. The output of the preamplifier 28 is fed into a comparator window provided by the positive/negative level detector 30, which detects minimum zero-peak voltage of $+/-338$ MVP in point-to-point configuration up to 1 km in length (e.g. as discussed regarding Mode 7). The outputs of the comparators of the positive/negative level detector 30 are fed into the LED control logic 32 which displays the status of the level test of Mode 7. An illuminated green LED indicates that the level falls within specification while an illuminated red LED indicates a level less than $-6$ dB is measured on the line. Incidently, as will be discussed in further detail hereinafter, the LED logic control 32 performs the function of selecting which test status is to be displayed by the status indicators (green and red LEDs). It receives its control logic from the switch interface 18.

The echo channel compare logic 22 compares the transmitted D bits (D1 and D2) to the receive echo bits (E1 and E2) every 125 $\mu$s (that is, every frame). This test is performed during Mode 1-line test, Mode 6-transmit test and Mode 5-monitor test. In Modes 1 and 6 a pattern of 01 is transmitted on D channel. The same pattern should be received on the receive line (echo bits 1 and 2). Any discrepancy between the E and D bits is an indication that an error exists on the line. In Mode 5 all D channels remain in an idle state (D=1). Any D channel activity by other equipment coupled to the NT is indicated when a mismatch between D and E bits occurs. The status of the test performed is the output of U9. U9 is sampled every 250 ms, then reset to its normal state. The output of U9 is fed to LED control logic 30, which will provide an indication in accordance with the particular mode being carried out.

It should be noted that an important aspect of the present invention is that the echo bit comparison is done on a bit-by-bit basis for all of the D channel information that is sent out from the test device to the NT. Thus, the present invention is capable of picking up any problem which is exhibited by the echo bits from the NT not matching the transmitted D channel information from the test device 10.

For the AC impedance Mode 3 short/open test, the SBC 14 is initiated to generate a continuous 96 kHz square wave with a 50% duty cycle which is transmitted over the S/T interface 12. "R sense" is a sensing voltage resistor having a voltage drop which is rectified and filtered to a DC voltage in the AC impedance short/open detector 34. The DC voltage is fed into a comparator window in the detector 34, which is set to detect a short (<40 ohms), open (>500 ohms) and a good line (40 ohms > good line > 500 ohms). The output of the comparators provide the input to LED control logic 32. An illuminated green LED indicates an open line while red indicates a shorted line. No light indicates a good line.

The IOM (ISDN oriented modular) bus interface 36 coupled to the SBC 14 is a 4-wire local interface for the interconnection of ISDN-devices within the ISDN basic access. It includes a receive and a transmit data line, 8-kHz FSC frame signal and a data clock signal of 512 kHz CK.

It should be noted that customarily the IOM bus is a conventional bus coupled to the 2080 Siemens SDC, and essentially consists of the SCS line, the CK line, and the serial out/serial in lines shown in FIG. 10. Typically, this is used in conjunction with a Siemens 2070 ISDN communication controller so that the two chips comprise a chip set.

However, in the present invention, the 2070 ISDN communication controller is not necessary, and is effectively replaced by the mode control logic 16 and the IOM bus interface 36. Basically, the mode control logic 16 sets the desired mode for the SBC 14, and the IOM bus interface 36 provides the timing signals for carrying out this mode of operation. As can be seen in FIG. 10, the IOM bus interface 36 includes the parallel/serial register 20 and a synchronizing data/echo clock circuit to provide clock strobes to the parallel/serial register. The synchronizing data/echo clock circuit also produces synchronizing clocks for the comparators of the echo channel compare logic 22 to synchronize these comparators to check the echo signals from the NT with the D channel information sent from the test device to the NT. As noted previously, this comparison on a bit-by-bit basis.

Activation of communication between the NT and the test device 10 can be achieved either by the NT or the test device. The test device 10 initiates a transition from the idle state to a synchronous state by applying a low signal to the data line (serial data input to the SBC 14) or a low to CLK ENB (clock enable). The NT responds by applying clock signals to the test device to synchronize the clocks in the test device. In the condition where both the NT and test set 10 are in an idle mode, activation occurs when the initiate switch SW-4 is depressed and CLK ENB goes low for approximately 500 ms enabling clocks FSC (8 kHz) and CK (512 kHz). The two clocks provide synchronization for down loading information to the SBC 14 serial input. The following instruction can be written to the SBC:

| INSTRUCTION UPSTREAM | CODE | REMARKS |
|---|---|---|
| ACTIVATE REQUEST 8 | 1000 | ACTIVATION D CHANNEL PRIORITY 8 |
| ACTIVATE REQUEST 10 | 1001 | ACTIVATION D CHANNEL PRIORITY 10 |
| 96 kHz | 0100 | 96 kHz TONE 50% DUTY CYCLE |
| 4 kHz | 0010 | 4 kHz TONE |

The instruction code is loaded into the parallel/serial register 20. The code input is provided by the mode control logic 16 which is programmed by switch SW-5. The sync data/echo clock circuit 38 provides the logic to synchronize the clocking of the data.

The mode control logic 16 selects one of the eight mode tests to be performed, as discussed previously. For Modes 1, 4, 5 and 6 the test is initiated by depressing the initiate switch SW-4. Reset then momentarily goes active and CLK ENB of SBC 14 is activated approximately for 500 ms through a delay 40. FSC and CK of SBC 14 become active which provides the clocks to IOM bus interface 36 and echo channel compare logic 22. The command code activate request 8 or 10 is written into the SBC 14. After the 500 ms time out set by delay 40, CLK ENB is disabled and FSC and CK go into a idle state if the NT master clock is not detected by the test device 14. In Modes 3 and 8 the IOM bus always remains active and the instruction code is written to the SBC 14 every 125 μs.

The operation of the eight modes will now be discussed with reference t the embodiments shown in FIG. 10.

To begin the line connection test of Mode 1, the mode control logic 16 is set (via SW-5) to the line test position and the initiate switch SW-4 is pressed. In response to this, the switch interface 18 generates a 4-bit code to the parallel/serial register 20, and this register 20, in turn, provides a serial output to the SBC 14 (e.g. the so-called "priority 10" serial code). The switch interface also generates a clock enable signal for the SBC 14 which begins the clocks FSC and CK (respectively 8 kHz and 512 kHz). By virtue of the switch interface 18 activating the clock enable terminal of the SBC 14 writing operations into the SBC 14 can be begin for the serial output of the parallel/serial register 20.

After 500 ms, the clock enable terminal of the SBC 14 goes inactive due to the fact that the input to the clock enable terminal from the switch interface 18 is provided through the 500 ms delay circuit 40. However, the FSC and CK clocks keep running if communication has been established with the NT.

Based on the priority 10 code received from the serial OUT of the parallel/serial register 20, the SBC 14 generates the Info 1–Info 4 signals to be sent to the NT through the S/T interface 12 to request activation. In addition to this, the switch interface 18 in Mode 1 is set to provide a repetitive signal of 01-01-01, etc. for the D channel information. This also goes through the parallel/serial register 20 and is provided to the SBC 14 through the serial OUT. The SBC then sends both the 4-bit code of Info 1-Info 4 and the D channel information (e.g. 01-01, etc.) to the NT.

In response to receiving the signals from the SBC 14, the NT will operate to synchronize the clocks of the test device to the clocks in the NT. The NT will also send back an echo signal E which should be the same as the D channel signal (e.g. 01-01-01, etc.). As mentioned previously, these echo signals are passed through the SBC 14 into the echo channel compare logic 22 where they are monitored every 125 μs (corresponding to one frame). The comparators in the echo channel compare logic 22 are set to compare the echo signals during predetermined times when it is expected to receive echo signals in response to the D channel information. If the echo signals fall within the expected time period and correspond to the D channel information originally sent out, a pulse output will be provided from the echo channel compare logic 22 (through U9). In other words, the compare circuits in the echo channel compare logic 22 determine whether the echo signals match the D channel information in the proper time frames for the echo signals to arrive. U9 will then activate the LED logic control 32 to provide a green light indicating a proper echo response (noting that this correspond to a low output level from U9). However, if the comparator circuits in the echo channel compare logic do not indicate a match between the echo signals and the original D channel signals, the output of U9 goes to a high level to light the red LED of the LED control logic 32. Counter U8 provides a 250 ms reset which will indicate if an error is a continuous error or an occasional one In other words, the gate U9 is reset every 250 ms so that it will not provide a continuous red indication through the LED control logic 32 if the mismatch of the echo and the D channel information only occurs occasionally. In the case of such an intermittent error, the LEDs will change between red and green, with the red indicating each time an error occurs.

As mentioned previously, the operation of Mode 1 serves to provide a quick indication of whether the line connection is satisfactory. If the test results indicate an unsatisfactory line connection, a quick way to check as to whether the receive and transmit lines are erroneously cross-coupled is to simply change the normal/reverse switch in the S/T interface 12 to the reverse position and run the Mode 1 test again. If the LED of the LED control logic 32 indicates green when this is done, it can be immediately verified that the problem was simply a reversing of the transmit and receive lines connecting the S/T interface 12 to the NT.

Mode 2 provides the test for polarity, and this begins by switching the mode control logic 16 to the polarity position. One purpose of this mode is to sense whether power is being properly supplied from the NT (if the NT has this capability). Of course, this test also indicates whether the polarity of such power is properly supplied (which can be used as an indication of whether the transmit and receive lines are improperly crossed).

When the mode control logic 16 is set to the polarity position, the switch interface 18 generates an output to the LED control logic 32 to check the status of the transformers T1 and T2 to determine if there is any voltage there. If a normal power feed is being provided from the NT, transformer T1 should have a positive voltage and transformer T2 should have a negative voltage. In such a case, the LED control logic will provide a green light. On the other hand, if the polarity at the transformers T1 and T2 is opposite to what it should be, the LED control logic 32 will provide a red light. It should be noted that the actual detection of the voltage at the transformers T1 and T2 is carried out by the polarity detector 24 which then provides an output to the LED control logic 32 for indicating either green or red.

Although the above description is directed to situations where power is actually supplied from the NT (i.e., phantom feed), other systems are designed to provide power from an outside source other than the NT. In such a case, the additional power source would typically be connected to the extra pins (e.g., pins 7 and 8) of the S/T interface 12 which are not used for connecting to the NT. In such a case, steps of monitoring the voltage at the transformers T1 and T2 using the polarity detector 24 such as those discussed above can be used to verify the proper connection of power from the external power source. Of course, in this case, this will not determine the actual proper connection of the transmit and receive lines with regard to the NT itself.

The Mode 3 impedance test begins by setting the mode control logic 16 to the impedance position. The switch interface 18 will then activate the clock enable terminal of the SBC 14 and will generate a different 4-bit code through the parallel/serial register 20 to activate the SBC 14 to generate a 96 kHz signal. This 96 kHz signal will go through SX1 and SX2 to the S/T interface 12 and onto the transmit line to the NT. The AC impedance short/open detector 34 will then check the voltage across the R sense resistor in the S/T interface 12. The voltage across this R sense resistor is rectified in the AC impedance short/open detector 34 and pass through a comparison window to indicate whether either a short or open circuit exists. The test continues by switching the normal/reverse switch in the S/T interface to the reverse position In this case, the 96 kHz signal will be sent through the receive line, and the R sense resistor will again be monitored by the AC impedance short/open detector 34 to determine whether either a short circuit or open circuit condition exists on the receive line.

In this manner, the circuit operates to quickly check for short and open circuit conditions.

In order to begin the Mode 4 receive test, the mode control logic 16 is switched to the receive position and the initiate switch SW-4 is activated. The purpose of this test is to verify the state of the receive line and to make sure that the NT is providing a minimum requirement of a framing clock for synchronizing the clocks in the test device. If this synchronizing clock is not provided from the NT, it will then be determined that either the receive line has a problem or the NT itself is not functioning properly.

In response to the setting of the mode control logic 16 to the receive position and the pressing of initiate switch SW-4, the switch interface 18 activates the clock enable of the SBC 14 and provides a 4-bit code through the parallel/serial register 20 to activate the SBC 14 to send a request activation signal to the NT. This will activate the clocks in the NT to provide a response to the S/T interface for purposes of synchronizing the FSC and CK clocks of the test device. After a predetermined time which would be sufficient for synchronizing the FSC clock, the clocks of the test device are turned off. If the NT is operating properly along the receive line of the test device, it will reactivate the FSC clock. This will be sensed by the "monitor FSC active" circuit 42, which will, in turn, provide a signal to the LED control logic to activate the green light. On the other hand, if the monitor FSC active circuit 42 determines that no FSC signal is being provided, the LED control logic 32 will provide a red indication.

It should be noted that in the illustrated embodiment the 500 ms delay circuit 40 controls the clock enable terminal of the SBC 14 to keep the clocks FSC and CK running for 500 ms after the initial activation by the switch interface 18. After this time period, the FSC and CK clocks should continue to operate by virtue of the synchronization with the clocks in the NT. Therefore, when the 500 ms delay circuit 40 deactivates the clock enable terminal 14, the FSC and CK clocks should continue to operate (i.e. be reactivated) even though a clock enable signal is no longer being provided to the SBC 14. Of course, the time of 500 ms delay has been chosen solely for purposes of example, and it not necessarily limiting to the present invention.

To conduct the Mode 5 monitoring test, the mode control logic 16 is switched to the monitor position and the switch SW-4 is pressed to initiate operations. This test is substantially identical to the line test of Mode 1 except that the D channel information provided to the NT is 1-1-1-1, etc. rather than 01. This will indicate to the NT that the test device is in an idle state. In a passive bus configuration, this will allow the bus to be used by any other TE which desires to communicate with the NT. The idle state condition will be indicated by the LE control logic through the green light. However, if another TE is on the bus and becomes active, the red LED will flash during such activity. Thus, Mode 5 allows the user to monitor what other equipment is doing on the line.

This monitoring test is provided to allow the user to check various things regarding the connection of other equipment. For example, if a TE is not working at a given location, the Mode 5 monitor test can be used at another location to determine if the non-functioning TE is actually transmitting D channel communication to the NT. This is done by monitoring echo bit activity from the NT. This can be useful for isolating the source of a problem with such other equipment.

As mentioned previously, the Mode 6 transmit test is identical to Mode 1 line test. The test is activated by switching the mode control logic 16 to the transmit position. This activates the switch interface to perform the same functions which are performed in Mode 1. The test is rerun because the user now knows the status of the receive line, and, based on this, can isolate on the transmit line since it is known that any problems which do exist are not on the receive line.

When the mode control logic 16 is switched to the level position, the switch interface 18 activates the LED control logic circuit 22 to monitor the output of the positive/negative level detector 30. As discussed previously, this positive/negative level detector 30 monitors the signals from the NT to determine if they are greater than or equal to 338 MVP (which is the −6 dB loss value for a typical NT output).

Finally, when the mode control logic 16 is switched to the 4 kHz test position, the switch interface 18 operates through the parallel/serial register to activate the SBC 14 to produce a continuous 4 kHz tone. This is typical used in conjunction with the speaker of another test device for tracing purposes.

Figure 11B:
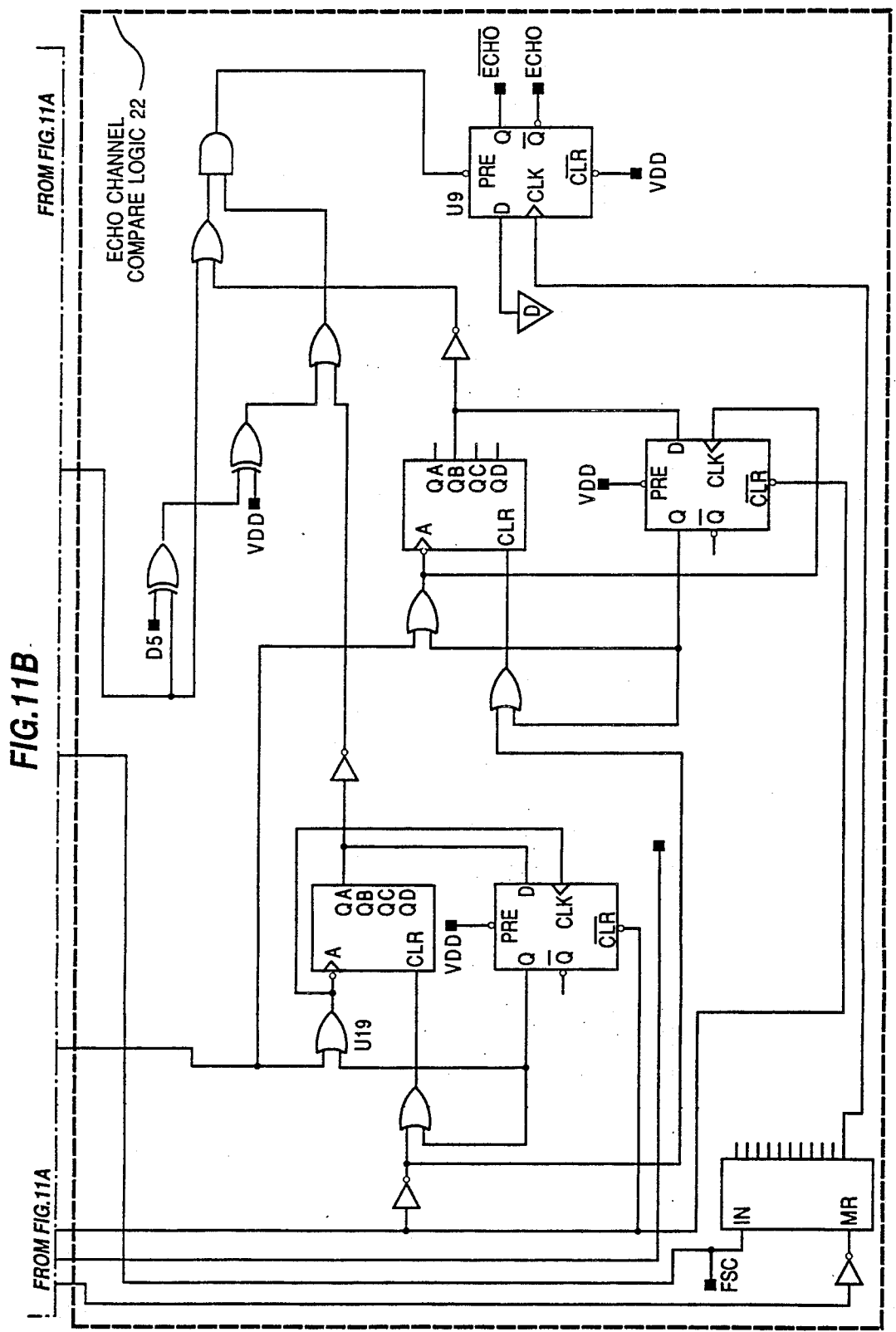
Figure 11C:
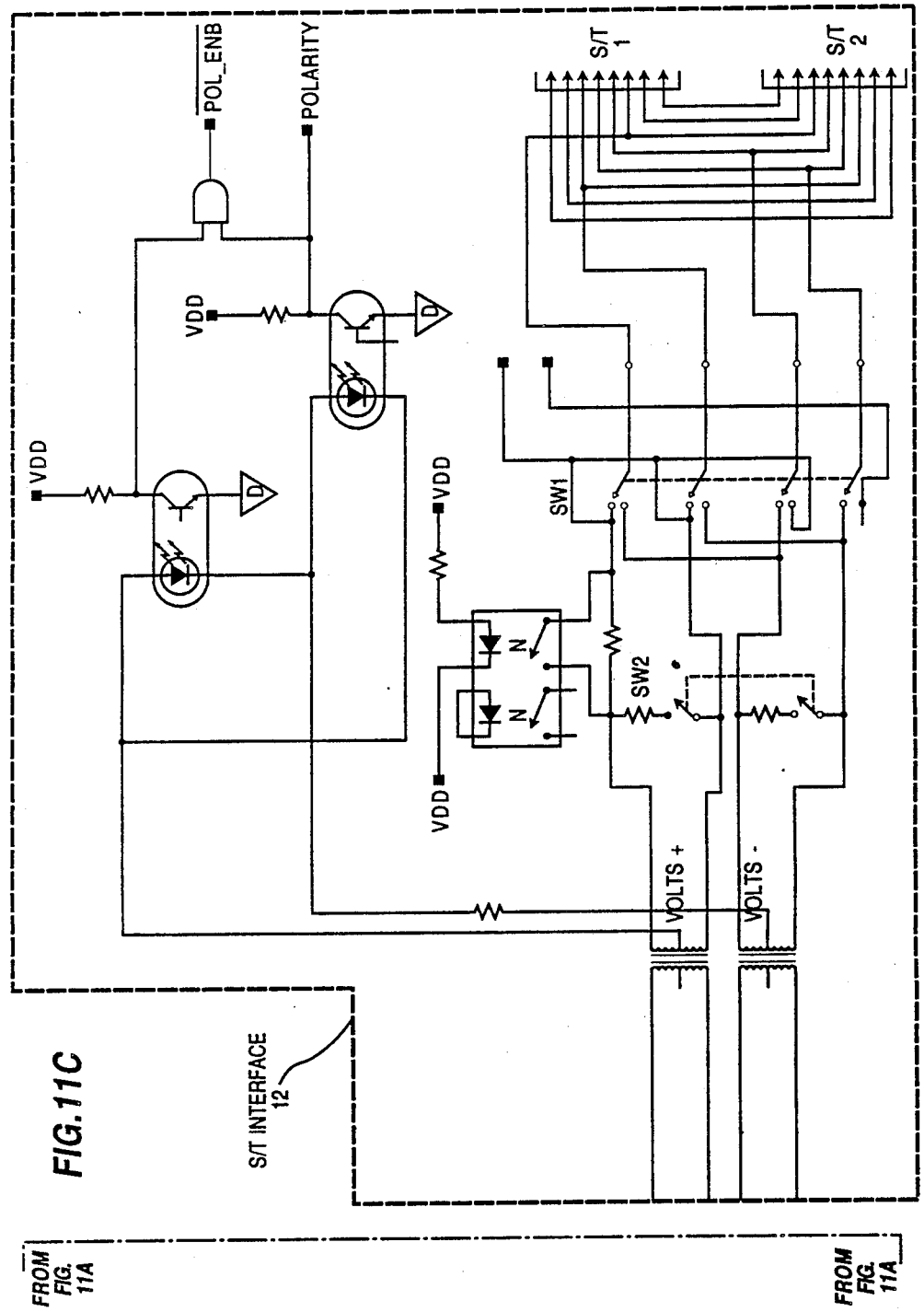

FIGS. 11 and 12 provide a detailed schematic diagram for implementation of the embodiment shown in FIG. 10. It is to be realized, of course, that these detailed figures are provided solely for purposes of example, and are not intended to limit the manner of construction of the embodiment of FIG. 10. Also, it is to be noted that FIG. 10 itself is provided as on embodiment for implementing the testing modes of the present invention. As such, although this embodiment has many advantages in carrying out the invention, it is not intended to limit the invention only to the specific arrangement of FIG. 10.

As described above, the present invention provides a testing apparatus and method which permits a quick check to be made regarding line connections between a TE location and an NT based on using a comparison of echo signals from the NT with the original D channel transmitted information (e.g. Mode 1). The invention further provides a sequence of additional tests to isolate on the problem if it is determined that the line connection is not satisfactory. Thus, a significant advantage of the present invention is that it is not necessary to conduct the additional detailed tests if the initial Mode 1 test indicates a satisfactory line condition. Further, it is a feature of the present invention that the very common problem of the transmit line and receive line being incorrectly switched is isolated upon quickly following the initial Mode 1 test. Yet another feature of the present invention is that it subsequently allows individually testing the transmit and receive lines to determine if the source of the problem is on one of these lines. As such, the present invention permits testing a variety of common problems in a very efficient manner to quickly isolate the source of any problem that may exist. And, as noted previously, this is done in a user friendly manner which does not require a great deal of training for operating the test equipment.

It is to be understood that the above-described arrangements are simply illustrative of the application of the principles of this invention. Numerous other arrangements may be readily devised by those skilled in the art which embody the principles of the invention and fall within its spirit and scope.

We claim:

1. A test device for an integrated services digital network (ISDN) system having a Network Terminator (NT), a system/terminal (S/T) interface for coupling the NT to a Terminal Equipment (TE), a transmit line between the S/T interface and the NT to permit a TE coupled to the S/T interface to transmit D channel and B channel information to the NT, and a receive line coupled between the NT and S/T interface to permit a TE coupled to the S/T interface to receive D channel and B channel information from the NT, said test device comprising:

means for coupling the test device to the S/T interface;

means for performing an initial line connection test to determine if a satisfactory line connection exists between the NT and the S/T interface connected by the transmit and receive lines by providing a predetermined signal to the NT from the test device and for evaluating a response from the NT to the predetermined signal, including means to indicate a satisfactory line connection between the S/T interface and the NT if the response from the NT is a predetermined response and for indicating an unsatisfactory line connection if the response is non-existent or is not said predetermined response; and means for performing a plurality of additional tests after said initial line connection test to determine the location of a problem in said line connection if the initial line connection test indicates that the line connection between the S/T interface and the NT is unsatisfactory.

2. A test device according to claim 1, wherein said means for performing a plurality of additional tests includes means for separately testing the transmit and receive lines to determine if a line connection fault exists in either one of these lines.

3. A test device according to claim 1, wherein said predetermined signal is a predetermined D channel signal for activating the NT to produce said response.

4. A test device according to claim 3, wherein said predetermined response is an echo signal which is substantially identical to the predetermined D channel signal.

5. A test device according to claim 1, wherein said means for performing a plurality of additional tests includes means for performing a polarity test of a power source signal provided from the NT to the S/T interface to determine if the transmit line and the receive line are connected between the NT and the S/T interface with proper polarity.

6. A test device according to claim 2, wherein said means for separately testing the transmit and receive lines includes means for performing a first test to determine impedance values along the transmit and receive lines, and means for performing additional individual tests of the transmit and receive lines based on activating communication between the NT and the test device and analyzing predetermined responses from the NT based upon a request to activate.

7. A test device for an integrated services digital network (ISDN) system having a Network Terminator (NT), a system/terminal (S/T) interface for coupling the NT to a Terminal Equipment (TE), a transmit line between the S/T interface and the NT to permit a TE coupled to the S/T interface to transmit D channel and B channel information to the NT, and a receive line coupled between the NT and S/T interface to permit a TE coupled to the S/T interface to receive D channel and B channel information from the NT, said test device comprising:

means for coupling the test device to the S/T interface;

means for transmitting a first predetermined D channel signal to said NT through said transmit line to request a response from said NT;

means for receiving a response from the NT to the test device on said receive line;

means for detecting a satisfactory line connection between the S/T interface and the NT if the response on said receive line is a predetermined signal and for detecting an unsatisfactory line connection between the S/T interface and the NT if the response on said receive line is either non-existent or is not said predetermined signal; and means for individually testing the transmit line and the receive line if said indicating means indicates an unsatisfactory line condition.

8. A test device according to claim 7, wherein said detecting means comprises means for determining whether the response on said receive line is an echo signal corresponding to the predetermined D channel signal provided to the NT on the transmit line.

9. A test device according to claim 8, wherein said detecting means comprises means for determining whether said echo signal exceeds a predetermined voltage level.

10. A test device according to claim 7, wherein said test device includes means for testing polarity of a power source signal provided from the NT to the S/T interface to determine if the transmit line and the receive line are connected between the NT and the S/T interface with proper polarity.

11. A test device according to claim 7, wherein said means for individually testing the transmit line and the receive line comprises:

means for testing whether a predetermined clock activation signal is received by said test device from said NT over said receive line to activate clocks provided in said test device to thereby determine if the receive line is operating satisfactorily; and means for transmitting a second predetermined D channel signal to said NT through said transmit line to request a response from the NT, after it has been determined that the receive line is operating satisfactorily, and means for detecting whether a predetermined response signal is received from the NT in response to the second predetermined D channel signal to thereby determine whether the transmit line is also operating satisfactorily.

12. A test device according to claim 11, wherein the second predetermined D channel signal is substantially identical to the first predetermined D channel signal.

13. A test device according to claim 7, further comprising means for performing a monitoring test to determine whether other equipment interfacing with the NT is operating, comprising:

means for providing an idle state D channel signal to the NT through the transmit line from the testing device; and means for monitoring the receive line to determine if the NT outputs any D channel signals while said testing device is providing said idle state D channel signals, to thereby determine whether said other equipment is operating.

14. A test device according to claim 11, further comprising means for performing a monitoring test to determine whether other equipment interfacing with the NT is operating, comprising:

means for providing an idle state D channel signal to the NT through the transmit line from the testing device; and means for monitoring the receive line to determine if the NT outputs any D channel signals while said testing device is providing said idle state D channel signals, to thereby determine whether said other equipment is operating.

15. A test device according to claim 7, further comprising means for checking for short circuit and open circuit conditions and proper line termination on said transmit and receive lines comprising:

means for generating a predetermined frequency signal for transmitting said predetermined frequency signal over said transmit line to said NT;

means for detecting a voltage at said S/T interface to determine if the transmit line is either opened or shorted;

means for transmitting said predetermined frequency signal over said receive line to said NT; and means for detecting a voltage at the S/T interface to determine if the receive line is either opened or shorted.

16. A test device according to claim 7, further comprising means for generating a predetermined tone signal on said transmit line between the S/T interface and the NT, wherein said predetermined tone signal is used as a trace signal for testing said ISDN system.

17. A test device for an integrated services digital network (ISDN) system having a Network Terminator (NT), a system/terminal (S/T) interface for coupling the NT to a Terminal Equipment (TE), a transmit line between the S/T interface and the NT to permit a TE coupled to the S/T interface to transmit D channel and B channel information to the NT, and a receive line coupled between the NT and S/T interface to permit a TE coupled to the S/T interface to receive D channel and B channel information from the NT, said test device comprising:

means for coupling the test device to the S/T interface;

means for performing an initial line connection test to determine if a satisfactory closed loop exists between the NT and the S/T interface connected by the transmit and receive lines by providing a predetermined signal to the NT from the test device and for evaluating a response from the NT to the predetermined signal, including means to indicate a satisfactory line connection between the S/T interface and the NT if the response from the NT is a predetermined response and for indicating an unsatisfactory line connection if the response is non existent or is not said predetermined response;

means for performing a second test of whether the transmit line and the receive line are incorrectly switched with one another between the NT and S/T interface if the initial line connection test indicates that the line connection between the S/T interface and the NT is unsatisfactory;

means for performing a third test to individually check impedance of the transmit and receive lines to determine if any short circuits or open circuits exist on the transmit and receive lines and whether the transmit and receive lines are properly terminated if the second test indicates that the transmit and receive lines are correctly coupled between the NT and the S/T interface;

means for performing a fourth test to verify that the receive line is providing a satisfactory connection between the NT and the S/T interface by detecting whether clock signals are sent from the NT to the test device if the third test indicates that the transmit and receive lines do not have any short circuits or open circuits thereon; and means for performing a fifth test to verify that the transmit line provides a satisfactory connection between the S/T interface and the NT by re-performing the initial line connection test if the fourth test verifies that the receive line provides a satisfactory connection between the NT and the S/T interface.

18. A test device according to claim 17, further comprising means for detecting a level of said response from said NT to the test device in response to said predetermined signal to determine if said response exceeds a predetermined level.

19. A test device according to claim 17, wherein said means for conducting said second test comprises switching means within said test device for re-performing the initial line connection test by providing the predetermined signal to the NT over the receive line and evaluating a response from the NT to the predetermined signal on the transmit line to determine if the transmit and receive lines are incorrectly switched with one another.

20. A test device according to claim 17, wherein said means for performing the second test comprises means for performing a polarity test of a power source signal provided from the NT to the S/T interface to determine if the transmit line and receive line are connected between the NT and the S/T interface with proper polarity.

21. A method of testing an integrated services digital network (ISDN) system having a Network Terminator (NT), a system/terminal (S/T) interface for coupling the NT to a Terminal Equipment (TE), a transmit line between the S/T interface and the NT to permit a TE coupled to the S/T interface to transmit D channel and B channel information to the NT, and a receive line coupled between the NT and S/T interface to permit a TE coupled to the S/T interface to receive D channel and B channel information from the NT, said method comprising:

performing an initial line connection test to determine if a satisfactory line connection exists between the NT and the S/T interface connected by the transmit and receive lines by providing a predetermined signal to the NT from the test device and for evaluating a response from the NT to the predetermined signal, including indicating a satisfactory line connection between the S/T interface and the NT if the response from the NT is a predetermined response and indicating an unsatisfactory line connection if the response is non-existent or is not said predetermined response; and performing a plurality of additional tests after said initial line connection test to determine the location of a problem in said line connection if the initial line connection test indicates that the line connection between the S/T interface and the NT is unsatisfactory.

22. A method according to claim 21, wherein said plurality of additional tests includes separately testing the transmit and receive lines to determine if a line connection fault exists in either one of these lines.

23. A method according to claim 21, wherein said predetermined signal is a predetermined D channel signal for activating the NT to produce said response.

24. A method according to claim 23, wherein said predetermined response is an echo signal which is substantially identical to the predetermined D channel signal.

25. A method according to claim 21, wherein said plurality of additional tests includes performing a polarity test of a power source signal provided from the NT to the S/T interface to determine if the transmit line and the receive line are connected between the NT and the S/T interface with proper polarity.

26. A method according to claim 22, further comprising performing a first test to determine the impedance values along the transmit and receive lines, and performing additional individual tests of the transmit and receive lines based on activating communication between the NT and test device coupled to the S/T interface and analyzing predetermined responses from the NT based upon a request to activate.

27. A method for testing an integrated services digital network (ISDN) system having a Network Terminator (NT), a system/terminal (S/T) interface for coupling the NT to a Terminal Equipment (TE), a transmit line between the S/T interface and the NT to permit a TE coupled to the S/T interface to transmit D channel and B channel information to the NT, and a receive line coupled between the NT and S/T interface to permit a TE coupled to the S/T interface to receive D channel and B channel information from the NT, said method comprising:

transmitting a first predetermined D channel signal to said NT through said transmit line to request a response from said NT;

receiving a response from the NT on said receive line;

detecting a satisfactory line connection between the S/T interface and the NT if the response on said receive line is a predetermined signal and for detecting an unsatisfactory line connection between the S/T interface and the NT if the response on said receive line is either non-existent or is not said predetermined signal; and individually testing the transmit line and the receive line if said indicating means indicates an unsatisfactory line condition.

28. A method according to claim 27, wherein said detecting step comprises determining whether the response on said receive line is an echo signal corresponding to the predetermined D channel signal provided to the NT on the transmit line.

29. A method according to claim 28, wherein said detecting step comprises determining whether said echo signal exceeds a predetermined voltage level.

30. A method according to claim 27, further comprising testing polarity of a power source signal provided from the NT to the S/T interface to determine if the transmit line and the receive line are connected between the NT and the S/T interface with proper polarity.

31. A method according to claim 27, wherein said step of individually testing the transmit line and the receive line comprises:

testing whether a predetermined clock activation signal is received by a test device coupled to the S/T interface from said NT over said receive line to activate clocks provided in said test device to thereby determine if the receive line is operating satisfactorily; and transmitting a second predetermined D channel signal to s id NT through said transmit line to request a response from the NT, after it has been determined that the receive line is operating satisfactorily, and detecting whether a predetermined response signal is received from the NT in response to the second predetermined D channel signal to thereby determine whether the transmit line is also operating satisfactorily.

32. A method according to claim 31, wherein the second predetermined D channel signal is substantially identical to the first predetermined D channel signal.

33. A method according to claim 27, further comprising performing a monitoring test to determine whether other equipment interfacing with the NT is operating, comprising:

providing an idle state D channel signal to the NT through the transmit line from a testing device coupled to the S/T interface; and monitoring the receive line to determine if the NT outputs any D channel signals while said testing device is providing said idle state D channel signals, to thereby determine whether said other equipment is operating.

34. A method according to claim 31, further comprising performing a monitoring test to determine whether other equipment interfacing with the NT is operating, comprising:

providing an idle state D channel signal to the NT through the transmit line from the testing device; and monitoring the receive line to determine if the NT outputs any D channel signals while said testing device is providing said idle state D channel signals, to thereby determine whether said other equipment is operating.

35. A method according to claim 27, further comprising checking for short circuit and open circuit conditions and proper termination on said transmit and receive lines comprising:

generating a predetermined frequency signal and for transmitting said predetermined frequency signal over said transmit line to said NT;

detecting a voltage at said S/T interface to determine if the transmit line is either opened or shorted;

transmitting said predetermined frequency signal over said receive line to said NT; and detecting a voltage at the S/T interface to determine if the receive line is either opened or shorted.

36. A method according to claim 27, further comprising generating a predetermined tone signal o said transmit line between the S/T interface and the NT, wherein said predetermined tone signal is used as a trace signal for testing said ISDN system.

37. A method for testing an integrated services digital network (ISDN) system having a Network Terminator (NT), a system/terminal (S/T) interface for coupling the NT to a Terminal Equipment (TE), a transmit line between the S/T interface and the NT to permit a TE coupled to the S/T interface to transmit D channel and B channel information to the NT, and a receive line coupled between the NT and S/T interface to permit a TE coupled to the S/T interface to receive D channel and B channel information from the NT, said method comprising:

performing an initial line connection test to determine if a satisfactory line connection exists between the NT and the S/T interface connected by the transmit and receive lines by providing a predetermined signal to the NT evaluating a response from the NT to the predetermined signal, including indicating a satisfactory line connection between the S/T interface and the NT if the response from the NT is a predetermined response and for indicating an unsatisfactory line connection if the response is nonexistent or is not said predetermined response;

performing a second test of whether the transmit line and the receive line are incorrectly switched with one another between the NT and S/T interface if the initial line connection test indicates that the line connection between the S/T interface and the NT is unsatisfactory;

performing a third test to individually check impedance of the transmit and receive lines to determine if an short circuits or open circuits exist on the transmit and receive lines and whether said transmit and receive lines are properly terminated if the second test indicates that the transmit and receive lines are correctly coupled between the NT and the S/T interface;

performing a fourth test to verify that the receive line is providing a satisfactory connection between the NT and the S/T interface by detecting whether clock signals are sent from the NT if the third test indicates that the transmit and receive lines do not have any short circuits or open circuits thereon; and performing a fifth test to verify that the transmit line provides a satisfactory connection between the S/T interface and the NT by re-performing the initial line connection test if the fourth test verifies that the receive line provides a satisfactory connection between the NT and the S/T interface.

38. A method according to claim 37, further comprising detecting a level of said response from said NT to the test device in response to said predetermined signal to determine if said response exceeds a predetermined level.

39. A method according to claim 37, wherein said second test comprises re-performing the initial line connection test by providing the predetermined signal to the NT over the receive line and evaluating a response from the NT to the predetermined signal on the transmit line to determine if the transmit and receive lines are incorrectly switched with one another.

40. A method according to claim 37, wherein the second test comprises performing a polarity test of a power source signal provided from the NT to the S/T interface to determine if the transmit line and receive line are connected between the NT and the S/T interface with proper polarity.

41. A test device for an integrated services digital network (ISDN) system having a Network Terminator (NT), a system/terminal (S/T) interface for coupling the NT to a Terminal Equipment (TE), a transmit line between the S/T interface and the NT to permit a TE coupled to the S/T interface to transmit D channel and B channel information to the NT, and a receive line coupled between the NT and S/T interface to permit a TE coupled to the S/T interface to receive D channel and B channel information from the NT, said test device comprising:

a mode control logic circuit for selecting a predetermined test mode for the NT and for producing predetermined mode control signals indicative of the selected test mode;

a control circuit coupled to the mode control logic circuit and to said S/T interface for producing predetermined D channel signals to be sent to the NT over said transmit line in accordance with the predetermined mode control signal produced by the mode control logic circuit; and an echo channel compare logic circuit coupled to said S/T interface for receiving echo signals on said receive lines which are produced by the NT in response to said predetermined D channel signals sent to the NT from said control circuit, wherein said echo channel compare logic circuit includes means for comparing the echo signal from the NT with the transmitted D channel signals on a bit-by-bit basis to determine whether a proper line connection exists between the test device and the NT.

42. A test device according to claim 41, wherein the predetermined mode control signals are parallel bit signals, and wherein said test device further comprises an interface circuit coupled between the mode control logic circuit and the control circuit, said interface circuit including a parallel/serial converting circuit for converting said parallel bit signal into a serial mode control signal, and further wherein said control circuit comprises a serial bus control circuit.

43. A test device according to claim 42, wherein said interface circuit further includes a synchronizing data/echo clock circuit coupled to said serial bus control circuit and to said echo channel compare logic circuit for generating predetermined clock signals to control the echo channel compare logic circuit to synchronize said echo channel compare logic circuit to the serial bus control circuit so that said echo signals received from said NT can be compared with the predetermined D channel signals sent to the NT on a bit-by-bit basis within a predetermined time frame.

* * * * *